Aug. 2, 1932.    M. W. HARD    1,869,420
VEHICLE SUPPORT
Filed June 7, 1928    3 Sheets-Sheet 1
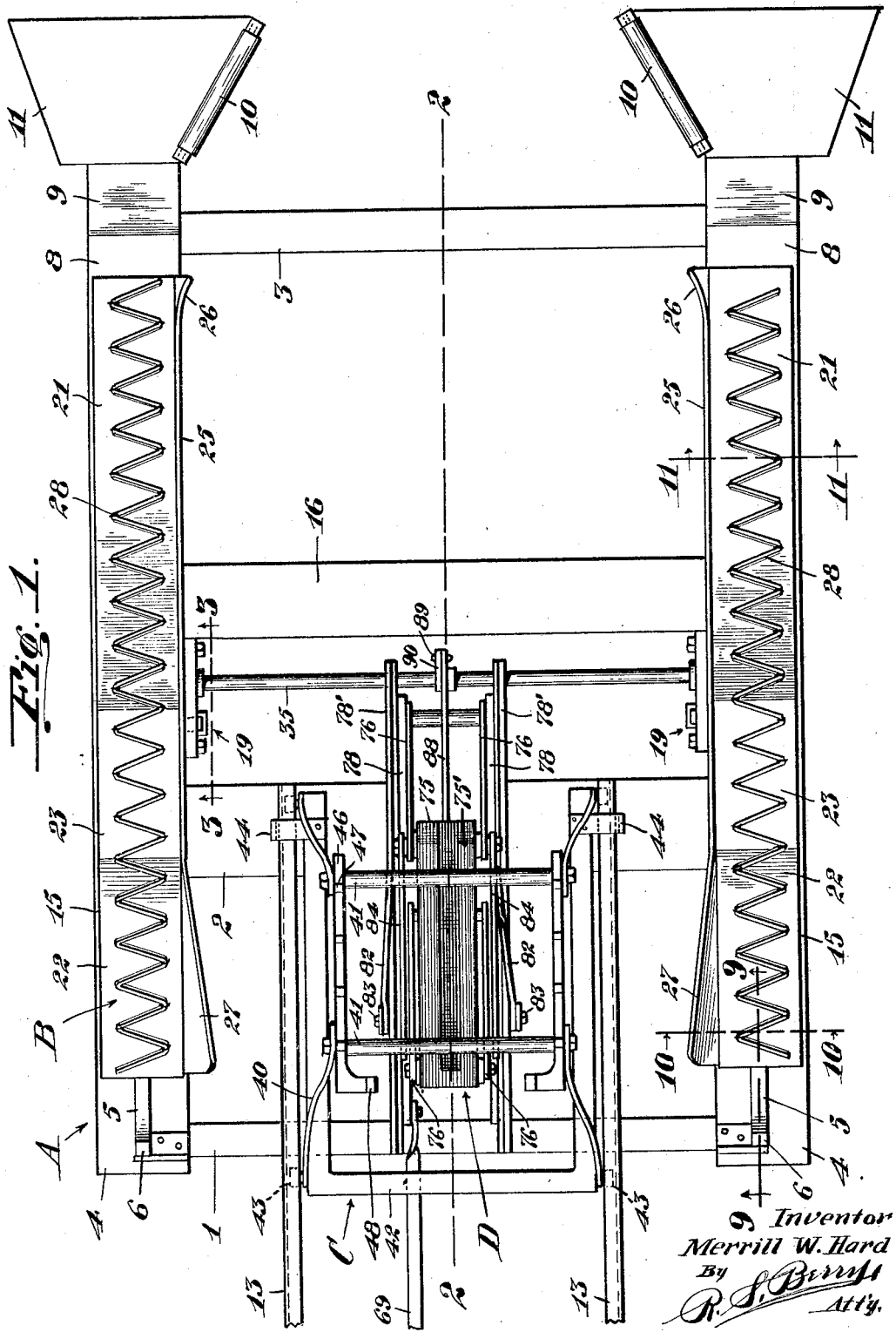
Inventor
Merrill W. Hard
By R. S. Berry
Atty.

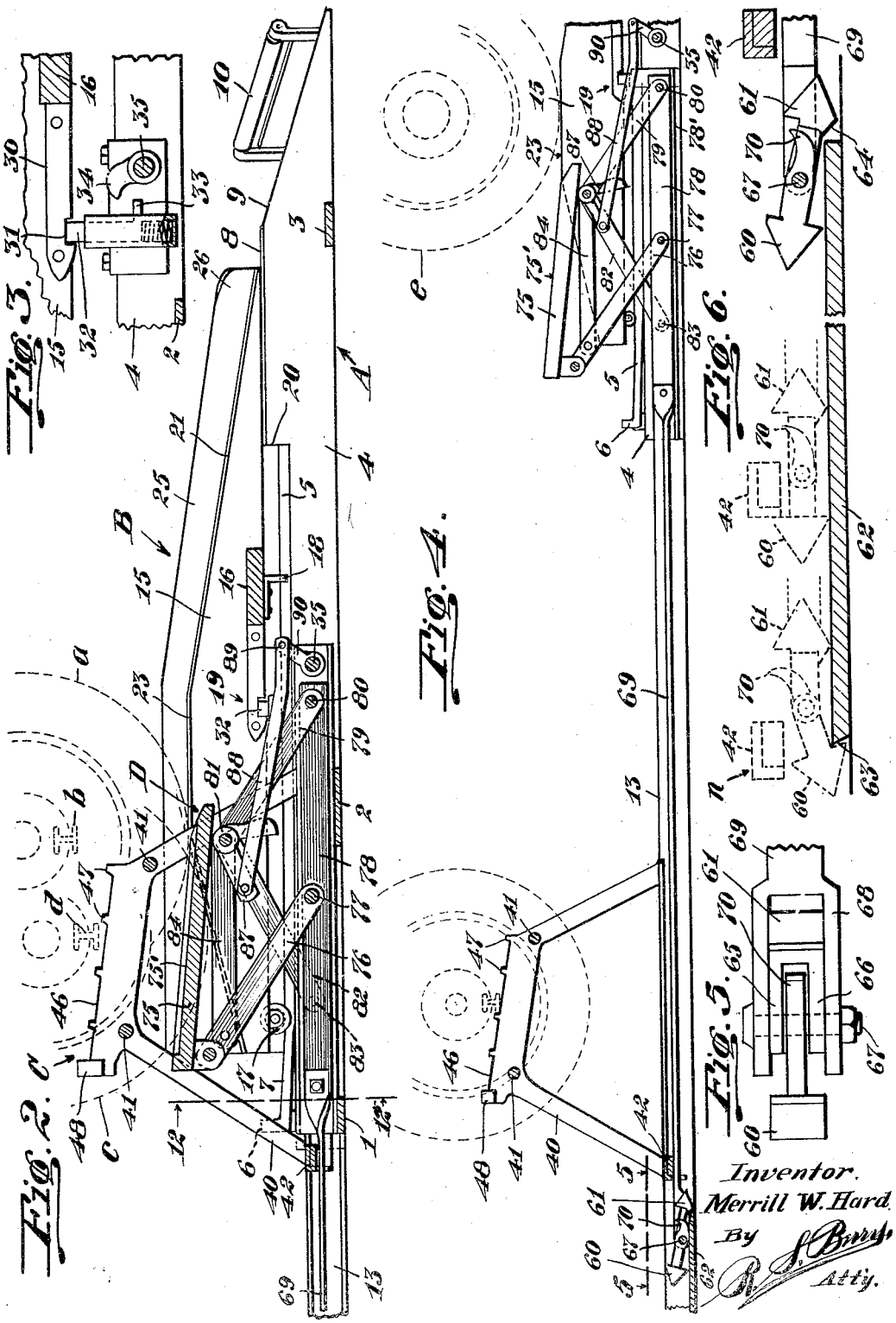

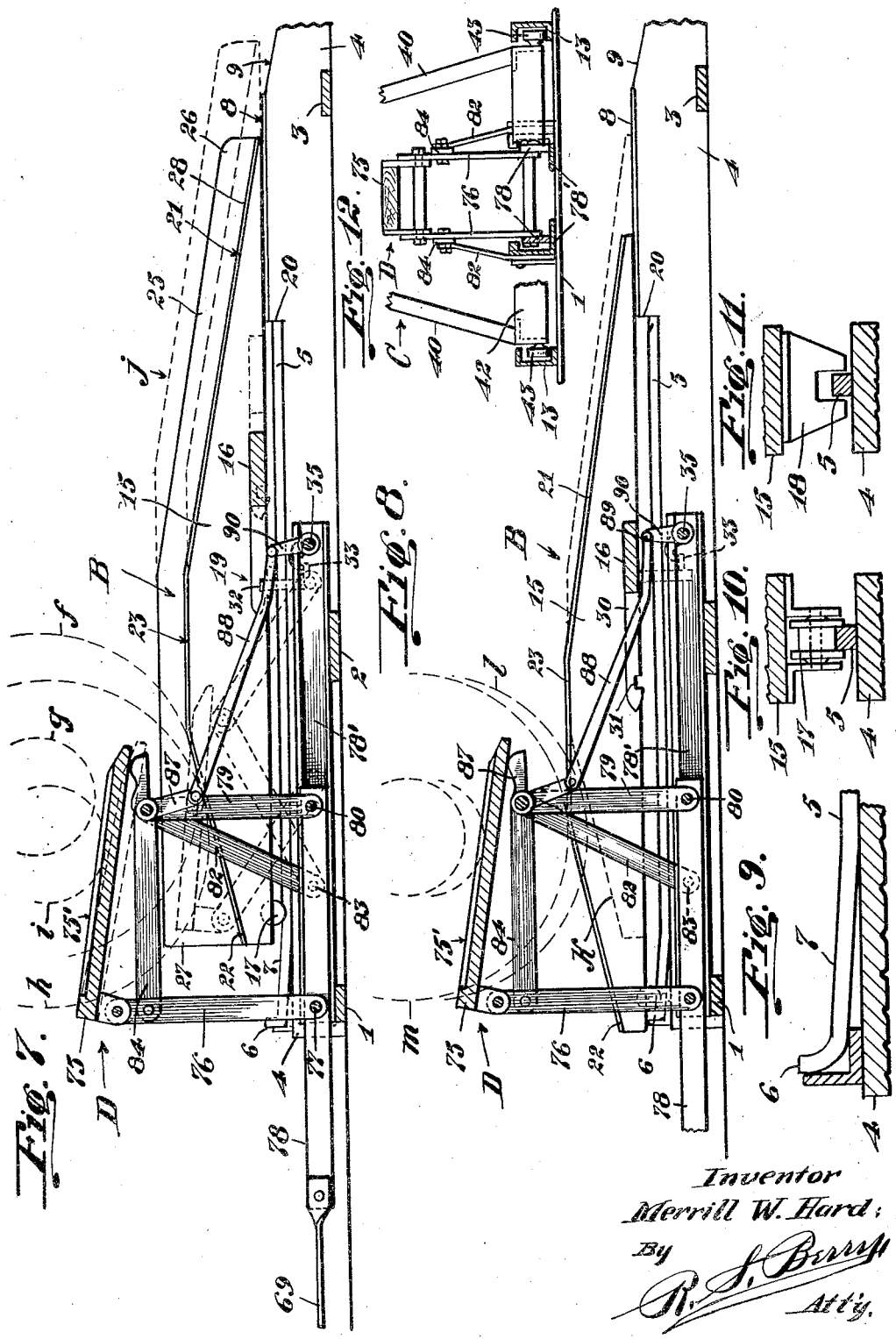

Patented Aug. 2, 1932

1,869,420

UNITED STATES PATENT OFFICE

MERRILL W. HARD, OF LOS ANGELES, CALIFORNIA, ASSIGNOR OF ONE-FOURTH TO LEBAN E. RICHEY, OF LOS ANGELES, CALIFORNIA, AND ONE-FOURTH TO OTTO B. ENGLISCH, OF CHICAGO, ILLINOIS

VEHICLE SUPPORT

Application filed June 7, 1928. Serial No. 283,676.

The hereinafter described invention relates to motor vehicle lifts and more particularly pertains to lifts of the type wherein the power of the vehicle is utilized to raise itself, such as is disclosed in my copending application for Letters Patent, Serial No. 116,159, filed June 15, 1926, patented Oct. 8, 1929, as Patent No. 1,730,610.

An object of the invention is to provide a device whereby motor vehicles, such as automobiles, trucks and the like, may be lifted and supported with all the wheels thereof clear of the floor and free to revolve and with the front wheels free to be turned laterally throughout the radius of their steering movement, and in which the raising and lowering of the vehicle is effected through the medium of the motive power of the vehicle, whereby the operation of placing the vehicle on its elevating supports and its removal therefrom may be controlled entirely by the vehicle operator from the driver's seat.

Another object is to provide a vehicle elevating and supporting mechanism of the above character in which the vehicle may be automatically disposed in an elevated position and supported solely on the front and rear axles thereof with no obstruction or support extending between the axles so as to afford a clear working space beneath the car and give ready access to underneath parts thereof.

Another object is to provide a vehicle lifting and supporting machine of the type specified which is so contrived that a machine of a predetermined size will automatically adapt itself to lift and support various sized motor vehicles regardless of differences in height of axles and lengths of wheel base, so as to obviate any necessity of making adjustments or to provide various sizes of the machines to meet varying conditions.

Another object is to provide a means in a vehicle elevating device of the type referred to in which all the wheels of the vehicle will be automatically freed for independent rotation during the elevation of the vehicle.

Another object is to provide a vehicle lifting and supporting mechanism which will afford a three point support for the vehicle axles in which the vehicle is moved under its own power to and from an elevated position on such support.

Another object is to provide a vehicle lift which is dependable and safe in its operation and use, so as to obviate all possibility of injury to a vehicle or operatives by reason of its employment.

A further object is to furnish a device of the above character, that is economical in manufacture, quickly installed, operable without material cost, inexpensively maintained, and which is automatic, rapid and efficacious in its operation.

Some of the advantages of my invention may be enumerated as follows:

A vehicle can be automatically raised by its own power within fifteen seconds;

By means of automatic locks on the lift and the latter being controlled by operation of the vehicle, there is no possibility of the vehicle carried thereon being accidentally lowered;

Because of the use of the power in the car to raise itself, the lift may be installed in any appropriate space, regardless of whether or not outside power is available; and Since there is no outside power utilized, the operating cost is negligible.

Briefly stated, my invention may be said to reside in a combination of ramps to raise the vehicle, a movable dolly to carry the front axle in its raised position, a collapsible support to receive the rear axle, together with means for effectively operating the collapsible support and ramps in timed relation to support the car with its wheels clear of the floor and free of the ramps.

With the foregoing objects and advantages in view, together with such other objects and advantages as may subsequently appear, the invention resides in the parts and features, and in the combination, construction and arrangement of parts hereinafter described and claimed and illustrated by way of example in the accompanying drawings, in which:

Fig. 1 is a top plan view of the device with the parts disposed in their normal position, showing the traveling front axle support or dolly, in position over the collapsible rear axle support when the device is in readiness to receive a vehicle;

Fig. 2 is a vertical section on line 2—2 of Fig. 1;

Fig. 3 is an enlarged fragmentary view as seen on the line 3—3 of Fig. 1, showing the catch mechanism that locks the movable ramp to the stationary base;

Fig. 4 is a vertical sectional view, showing the traveling dolly or front axle support in a forward position and about to engage the mechanism that controls the rear axle support, the vehicle front axle and its wheels being shown in dotted lines as then carried on the dolly, and the vehicle rear axle and wheels being shown in dotted lines with the wheels supported on the ramp and the axle about to move over the rear axle support;

Fig. 5 is an enlarged top plan view as seen on the line 5—5 of Fig. 4, showing the tripping mechanism that is engaged and operated by the traveling dolly to effect actuation of the rear axle support;

Fig. 6 is an enlarged fragmentary sectional view of the same, illustrating various positions of the parts;

Fig. 7 is a view in section and elevation of the rear axle support and ramp, indicating in dotted lines, the rear axle support as positioned preparatory to depositing the vehicle rear axle on the support, and showing in full lines, the parts as positioned when the rear axle moves onto the rear axle support, and further showing in dotted lines, the ramp as kicked back to free the vehicle rear wheels when the rear axle is on the support;

Fig. 8 is a similar view, showing the manner in which the ramps are advanced in effecting removal of the vehicle rear axle from the support; the ramp being shown in dotted lines as disposed to be engaged by the vehicle rear wheels and being shown in full lines in a fully advanced position assumed under the action of retrograde rotation of the rear wheels;

Fig. 9 is a detail of the forward end of the track upon which the ramp travels as seen on the line 9—9 of Fig. 1;

Fig. 10 is a vertical sectional view on line 10—10 of Fig. 1;

Fig. 11 is a vertical sectional view on line 11—11 of Fig. 1;

Fig. 12 is a fragmentary detail in section and elevation with portions removed as seen on the line 12—12 of Fig. 2.

By referring to Fig. 1, the device is seen to consist of four major units, comprising a base generally designated A, movable ramps designated B in their entirety, a movable dolly generally designated C, and a collapsible support designated by D, together with mechanism for coordinating these units into an operable machine. These units will be taken up and described in the above order.

The base A is here shown as consisting of three cross members 1, 2 and 3, respectively, upon which are securely fastened a pair of parallel sills 4. Mounted upon each of these sills and extending longitudinally thereof, is a track 5, which is turned up at its forward end to form a bumper as shown at 6, the forward end portion of the track inclining upwardly to the bumper as indicated at 7 in Fig. 9. This track forms a guide on which the ramp B is carried, and affords with the base A, a support for the ramps. The rear part of each sill has a flat portion 8, while the extreme rear or approach end thereof is sloped as shown at 9 to give a gradual rise from the floor. As a means of insuring the vehicle wheels being guided upon the ramp, rollers 10 are provided at the approach to each sill. These rollers are mounted on the inside of flaring plates 11 and are themselves given an angle that will crowd the wheel over to the proper tread. The plates 11 are in turn securely attached to the sloping rear end of the sills 4. By this arrangement, the rolls are given an outward angle of approach as well as an upward angle and serve to bring the front wheels as well as the rear wheels into alignment for ascending the ramp. Attached to the cross members 1 and 2 is a pair of parallel rails 13, which extend forwardly therefrom and constitute a track on which the dolly C travels.

The ramp B embodies a pair of parallel ramp members 15 which are rigidly held together by a cross member 16, and are mounted upon the sills 4. Each ramp member has an ascending plane 21 at its approach end and a descending plane 22 at its opposite end with a horizontal flat surface 23 between these planes. The front end of each ramp member is fitted with a double flanged roller 17 as shown in Fig. 2, which is carried by the track 5, while the rear end is guided by a fork 18, which is suitably attached to the under side of the movable ramp member 15 and straddles the rail 5 as shown in Fig. 11. This arrangement also provides a stop for the back travel of the ramp.

In Fig. 2, the ramp is shown in the intermediate or locked position, but upon releasing a locking device 19 as later described, the ramp is left free to travel backwards until the fork 18 engages a shoulder 20 on the rear part of the sill 4, which limits its travel to this distance.

As a means of providing a stable ramp in any of its positions, the rear end is allowed to rest upon the sills. This brings the two plane surfaces together and not only provides a flat bearing surface for stability, but due to frictional resistance, as a vehicle ascends the ramp, tends to hold the ramp immovable and relieves the locking mechanism of any undue strain against forward movement.

The ramp members 15 are each provided with an inner flange 25 to hold the vehicle wheels from slipping from the ramp tread. To avoid tire abrasions, the flanges are flared inwardly at each end as shown at 26 and 27. As a further means of holding the wheels on the treads, I provide a zig-zag arrangement of a square iron bar as shown at 28, which is held to the ramp by stapling in each bend. I do not wish to confine myself to this particular construction as the bar may be attached in any suitable manner, as by welding, or the zig-zag effect may be obtained by pressing sheet metal, or the ramp may be cast with the zig-zag tread in place.

Since it is necessary to have means that lock the ramp against movement relative to the sills when the vehicle front wheels are raised and just as necessary to have free movement in mounting and demounting the vehicle rear wheels, I employ the following mechanism to get this result.

Mounted upon the inward side of each ramp member 15 as shown in Fig. 3, is a fixed plate 30 having a square notch 31 on its lower edge. To co-act with this plate, I have provided a spring impelled plunger 32 fixedly mounted upon the immovable sills 4. This plunger has a lug 33 extending therefrom which is adapted to be engaged and depressed by a cam 34. The cam 34 is rigidly mounted upon a rock-shaft 35 which is suitably journalled in the plate carrying the plunger 32. The mechanism for operating the shaft 35 will hereinafter be more fully described.

The movable dolly C is provided to receive the front axle of a vehicle advanced over the ramp, and to carry it forward in an elevated position until the vehicle rear axle is supported upon the rear axle supporting member D. In its travel forward, I have provided mechanism that is engaged by the dolly to effect raising of the rear supporting member ready to receive its load, before the vehicle rear wheels leave the high part of the ramp. The dolly consists of side members 40 which are joined together at the top by bars 41 and suitably attached to a U-frame 42 at the bottom. Rollers 43 are suitably attached to the frame 42 and bear upon the parallel rails 13 as shown in Fig. 12. Bars 44 are attached to the U-frame 42 and extend over the rails 13 and are bent downwardly and serve as guides to hold the rollers in the rails, which latter are shown and preferably comprise channel irons arranged with the channels opening toward each other.

The top of each side member 40 of the dolly embodies an elongated rearwardly sloping top face 46, which constitutes an ascending plane relatively to the descending plane 22 of the ramp, and which is equipped with small upstanding lugs 47. The purpose of these lugs is to form a stop against which the front axle of the vehicle abuts as the vehicle front wheels move down the descending plane 22 of the ramp. At the extreme forward ends of the top members 46, I have provided large upstanding lugs 48 which are designed to engage any extremely high axle and make it impossible to run any vehicle down the descending plane of the ramp without the forward axle thereof engaging the top of the dolly.

It is to be understood that the rearwardly sloping plane 46 of the top member 40 of the dolly intersects the forwardly sloping plane 22 of the ramp at a point which makes it impossible for the front axle of the vehicle to avoid seating upon the members 40; the ascending plane 46 of the dolly, and the descending plane of the ramp being of approximately the same length and normally arranged so that their leading ends are substantially in transverse alignment with the leading end of the ascending plane of the dolly disposed on a plane above that of the descending plane of the ramp, whereby as the front wheels of a vehicle move down the descending plane of the ramp the front axle of the vehicle will be moved downwardly at an inclination against such of the lugs 47 or 48 as lie in its path and then come to rest on the ascending plane of the dolly. It is this combination of intersecting planes that produces a device that automatically adjusts itself to various vehicle wheel diameters or heights of front axles, and thereby imparts great selectivity to the lift.

After the front wheels have ascended the ramp and the front axle has been deposited upon the traveling dolly, the vehicle continues to travel forward under its own power with the traveling dolly supporting the front axle of the vehicle and traveling with it. In its forward travel, the dolly C engages a tripping mechanism (embodying pawls 60 and 61) that operates to raise the collapsible rear support D into a supporting position ready to receive the rear end of the vehicle before the rear wheels are ready to descend the forward sloping plane 22 of the ramp.

It is obvious under this arrangement that the tripping may occur at any predetermined point in the forward travel of the dolly C; the only limitation being that the rear support must be raised in time to receive the rear axle of vehicles of short wheel base yet to be raised at such delayed interval as not to engage the vehicle clutch housing or other projections beneath the vehicle; and since the dolly continues to travel after bringing the rear support to an upright position, it is equally manifest that a vehicle of long wheel base may be mounted with the same ease and facility. The result is a device that automatically accommodates itself to vehicles of any length of wheel base.

An enlarged view of the tripping mechanism is shown in Figs. 5 and 6. It is seen to be composed of a plate 62 suitably fixed in relation to the track rails 13 in a position to permit the pawls 60 and 61 to ride over it.

The forward end of the plate 62 is undercut as shown at 63, while the underside of the pawl 61 is bevelled as at 64. The pawl 61 is bifurcated and the lugs 65 and 66 thereof are pivotally mounted on a pin 67, which pin is carried in a yoke 68 on the end of a rod 69 leading to the rear axle support. Pivotally mounted on the pin 67 between the lugs 65 and 66, is the pawl 60. The rear part of the pawl 60 is equipped with a hook 70. The purpose of this hook is to afford a means for automatically releasing the pawl 60 from the locked position at the forward end of the plate 62 after being engaged therewith as shown in dotted lines in Fig. 6.

In operation, the tripping mechanism functions as follows:

As the dolly C moves forward, the front cross member of the U-frame 42 rides freely over the pawl 61 and hook 70, but engages the pawl 60 and carries them all forwardly together with the rod 69, until the pawl 60 drops over the undercut end of the plate 60 into a locked position, the pawl 61 riding over the rear end of the plate 62 to an elevated position on the latter. The frame 42 of the dolly is then released and continues to travel forward leaving the pawl 60 securely locked against retrograde movement. To release the pawl 60 when the dolly returns, the rear side of the U-frame 42 engages the hook 70 which has been brought upright by the pawl 60 dropping over the end plate 62. The pawl 61 then stands ready to engage the U-frame 42 on the rear side and carry the tripping mechanism back until the pawl 61 drops over the rear end of plate 62 and thereby clears the dolly, thus allowing the dolly to travel freely the rest of the way to the ramp. The rod 69 referred to in the foregoing description is the connection medium between the dolly and the collapsible support D. The collapsible support, which is devised to support the rear end of the vehicle after it leaves the ramp, comprises an elongated saddle 75, which is pivotally supported at its forward end by a link 76, and slopes rearwardly and forms on its upper face, an ascending plane 75' relatively to the descending plane 22 of the ramp, which planes intersect. The other end of the link 76 is pivotally connected at 77 to a sliding carriage 78. The rear end of the saddle 75 is loosely supported by a system of linkage comprising a link 79 pivotally connected at 80 to the sliding carriage 78 and pivotally joined at 81 to another link 82 which is pivotally connected at its lower end as at 83 to a stationary part of the frame. A cross link 84 pivotally connects with the upper portions of links 76 and 79 and serves as a means of holding the saddle 75 in its proper position. This system of linkage is duplicated on each side of the saddle thus giving a stable support to the saddle. Carriage 78 is frictionally slidable on and guided by rails 78' fixed on the frame members 1 and 2, as shown in Fig. 2.

In Fig. 2, the rear axle support is shown in collapsed position, but in Figs. 7 and 8, it is shown in raised positions. The raising is accomplished by pulling the rod 69 forward, which rod has been previously described as connected with the tripping mechanism, actuated by the traveling dolly. As the rod 69 goes forward, it pulls the carriage 78 to which it is attached, with it. This in turn moves forward, the lower end portions of links 76 and 79 and thus advances the upper ends of the links 76 and 79 to cause the saddle to rise correspondingly, the thrust of links 82 causing this action. The travel of the carriage 78 continues until the links 76 and 79 stand substantially vertical as shown in Figs. 7 and 8, at which time the tripping mechanism hereinbefore described operates to release the dolly and leaves the rear axle supporting mechanism locked in upright position ready to receive the rear axle of the vehicle; the pawl 60 then being engaged with the end 63 of the plate 62 acting to hold the rear axle support in its elevated extended position against accidental collapse.

During this operation, another system of links has been operating preparatory to releasing the catch that locks the movable ramp to the sills. This system consists of a bell crank 87 pivotally mounted under the loose rear end of the saddle 75. One arm of the bell crank is pivotally connected to a link 88 which link in turn is pivotally connected as at 89 to a crank arm 90. The crank arm 90 is fixedly mounted upon the rock shaft 35. The function of this system is to release the movable ramp from the sills after the vehicle has come to rest upon the saddle 75, and is accomplished in the following manner.

As the carriage 78 travels forward, the link 88 being held from travel by its pivot point 89 rotates the bell crank 87 into the position shown in Fig. 7. This position slightly raises the rear end of the saddle 75, so that when the weight of the vehicle is deposited on the saddle, it is depressed and rotates the bell crank which acts through the link 88 to rotate the crank 90 and effect turning of the rock shaft 35. As before described, this brings the cam 34 into engagement with the lug 33 on the spring impelled plunger 32 and withdraws it from the notch 31, thus releasing the movable ramp for forward movement upon the sills. It is seen by this arrangement that as long as the rear axle remains seated on the saddle, the ramp lock is disengaged.

In operation, the parts are initially disposed as shown in Figs. 1 and 2, that is, with the rear axle support collapsed, with the front axle support astride the rear axle support, and with the ramp in its intermediate position and locked against movement in either direction, the trip mechanism being then disposed as shown in full lines in Fig. 6. The vehicle is then driven up the ascending plane of the ramp and after crossing the flat surface, the front wheels of the vehicle ride down the descending forward plane of the ramp until the front axle engages the ascending plane on the traveling dolly. This is facilitated by reason of the relative locations of the descending plane of the ramp and the ascending plane of the dolly as shown in Fig. 2, in which it will be seen that when the vehicle front wheels are supported on the flat surface of the ramp as indicated by the dotted lines $a$, the front axle, as indicated at $b$, will be disposed on a plane well above the lower end of the ascending plane of the dolly, and when the wheels move down the descending plane of the ramp, as indicated at $c$, the front axle will advance over the dolly and will move downwardly toward a seated position on the dolly as indicated at $d$.

The car is still under its own power, and as it advances, it pushes the traveling dolly outwardly as shown in Fig. 4, until the dolly engages the tripping mechanism and raises the collapsible rear support. During this operation, the rear wheels, indicated at $e$ in Fig. 4, traverse the ramp, which is still locked, and ride down the forwardly descending plane of the ramp, until the differential housing on the rear axle encounters the ascending plane of the saddle 75, which is then elevated as shown in Fig. 7, the dotted lines $f$ in this figure indicating the rear wheels as disposed on starting to descend to position the differential housing $g$ of the rear axle over the saddle, and the dotted lines $h$ and $i$ showing the wheels and housing as disposed when the latter engages and depresses the saddle and come to rest thereon. The saddle being elongated is adapted to receive rear axles of vehicles spaced at various distances from the front axle thereof, and is inclined to receive rear axles of various heights; the rear axles being deposited at various positions lengthwise of the saddle according to the length of the vehicle wheel base and the height of the axle. Depression of the saddle 75 rocks the bell crank 87 and operates the mechanism that unlocks the movable ramp whereupon the rotating rear wheels of the vehicle act to kick the movable ramp rearwardly as indicated in dotted lines $j$ in Fig. 7. The ramp is then clear of the wheels and the car is mounted free from any contact except a three point support, two on the movable dolly and one under the differential housing. The space beneath the vehicle is then clear and permits easy access to any part thereof.

To dismount the car, the ramp which is then free for movement longitudinally of the sills, by reason of the ramp engaging catch being held retracted, is manually pushed against the rear wheels as indicated in dotted lines $k$ in Fig. 8, in which $l$ indicates the supported position of the rear wheels. The rear wheels are then driven in reverse rotation which by reason of frictional engagement of the wheels with the descending plane of the ramp acts to draw the ramp under the wheels and in so doing operates to raise the rear wheels substantially upward, as indicated in dotted lines $m$ in Fig. 8, before any backward movement of the vehicle takes place, thus allowing the rear axle to freely leave the saddle. This forward movement of the ramp is limited by the roller 17 encountering the bumpers 6 on the tracks 5. The rollers 17 in moving against the bumpers traverse the upward inclines 7 of the tracks 5 which impedes advance of the ramps under the urge of the vehicle wheels forward movement of the ramp being further opposed and retarded by the frictional drag of the rear end of the ramps on the sills so as to minimize impact against the bumpers. The inclines 7 also serve to slightly elevate the forward end of the ramp. On continued rotation of the rear wheels, they advance up the forward inclined end of the ramp and subsequently ride down the rear inclination of the ramp and over the sills to the floor, during which operation the ramp is maintained in its forwardmost position. The backward movement of the vehicle retracts the dolly which is then disposed forward of the tripping mechanism; the frame member 42 of the dolly being disposed in front of the pawls of the tripping mechanism when the vehicle is on the support, a distance determined by the length of the vehicle wheel base, as indicated by the dotted lines $n$ in Fig. 6. The dolly actuates the tripping mechanism to release the latter as before described, and on retrograde movement of the dolly, the rear axle support is collapsed and restored to its normal position and in so doing operates the rock shaft to retract the cam and release the ramp engaging catches to dispose them in readiness for reengagement with the ramp.

In effecting rearward movement of the dolly the front axle may advance on the dolly against the adjacent lugs 47 over which the axle passed in advancing onto the dolly, thus effecting such engagement with the dolly as to insure retractive movement thereof; the lugs 47 thus serving to prevent the front axle from being accidently moved out of supporting engagement with the dolly.

Since the movable ramp is in a forward position relative to the position it was in when the front axle was deposited on the traveling dolly, it is manifest that the front wheels will engage the ramp at a point further forward than the one where they left the ramp. This will cause the front wheels to roll slightly and raise the front axle clear of the dolly and to a plane such that the underside of the axle will clear the lugs 47 rearward thereof as the wheels roll upward on the plane 22 of the ramp, but the ramp will slide back into its normal position due to the pull of the front wheel thereon, where it will be again locked in its normal position. The car is then backed clear of the lift by its own power and the lift is ready for another operation.

Considering the mode of operation in general it will be seen that elevation of the vehicle is obtained by advancing the vehicle on its wheels onto the ramp, and that the positioning of the vehicle in its supported position on its axles and its removal therefrom is effected entirely automatically under action of movement of the vehicle.

An important feature of the invention resides in the device being self-accommodating to vehicles of various heights of axles and of various lengths of wheel base, whereby it may be employed with practically all makes of automobiles now generally in use, this being afforded by the provision of the elongated axle-supporting surfaces of the dolly and rear axle support.

Having thus set forth and described one embodiment of my invention, which manifestly is susceptible to modifications and refinements, I reserve the right to such variations as do not depart from the scope of the appended claims.

I claim:

1. A lift for automobiles comprising a ramp, a movable dolly adapted to carry the front axle of the automobile in an elevated position, a movable carriage, a supporting saddle, supporting links pivotally connecting said carriage and saddle, a rod extending forwardly from said carriage, means on said rod engageable by said dolly to advance said carriage, and links connecting said supporting links to a stationary point operable on advance of said carriage to swing said supporting links upwardly.

2. A lift for automobiles comprising a ramp, a movable dolly adapted to carry the front axle of the automobile in an elevated position, a collapsible support consisting of a movable carriage, a supporting saddle, means for supporting said saddle; said saddle having an ascending plane and being pivotally mounted at its forward end on said supporting means with its rear end free, supporting links connecting said supporting means to a stationary point, and means connected to said carriage engageable by said dolly for moving said carriage to cause said saddle to rise.

3. A lift for automobiles comprising a movable ramp, means for locking the ramp against movement, a movable dolly adapted to carry the front axle of the automobile in an elevated position, a collapsible support consisting of a movable carriage, a supporting saddle, means for supporting said saddle, said saddle having an ascending plane and being pivotally mounted at its forward end on said supporting means with its rear end free, supporting links pivotally connecting said supporting means to said movable carriage, a second set of links pivotally connecting said supporting means to a stationary point, means engaged by the free end of said saddle operable to release the above mentioned locking means, and means on said carriage actuated by movement of said dolly for moving said movable carriage to cause said saddle to rise.

4. A lift for automobiles comprising a ramp, means for causing the wheels of the automobile to align with said ramp, said means comprising rolls positioned at the start of the ramp.

5. A lift for automobiles comprising a ramp, means for causing the wheels of the automobile to align with said ramp, said means comprising rolls positioned at the start of each ramp, said rolls being placed at a horizontal and a vertical angle to the line of approach to said ramp.

6. In an automobile lift, a ramp having an ascending plane and a descending plane at its opposite ends, means frictionally supporting the end of the ramp having the ascending plane, rolling means supporting the end of the ramp having the descending plane, said ramp being movable longitudinally, means for limiting forward movement of the ramp, and means cooperating with the rolling support of the ramp for impeding forward movement thereof.

7. In an automobile lift, a vertically collapsible rear axle support, a movable dolly constituting a front axle support, means whereby the front axle of the vehicle may be deposited on said dolly by advance of the vehicle, said dolly being movable under the urge of the advancing vehicle, a trip mechanism connected to said rear axle support engageable by said dolly on advance movement thereof to advance therewith to elevate said rear axle support into its axle engaging position, a plate supporting said trip mechanism while engaged by said dolly formed to cause said trip mechanism to become disengaged from said dolly on the latter being advanced a pre-determined distance to permit continued advance of the dolly after said rear axle support has been elevated.

8. In an automobile lift, a vertically collapsible rear axle support, a movable dolly constituting a front axle support, means whereby the front axle of the vehicle may be deposited on said dolly by advance of the vehicle, said dolly being movable under the urge of the advancing vehicle, a trip mechanism connected to said rear axle support arranged to be engaged by said dolly and operable by advance movement of said dolly to elevate said rear axle support into its axle engaging position, means for disengaging said trip mechanism from said dolly on the latter being advanced a pre-determined distance to permit continued advance of the dolly after said rear axle support has been elevated, means embodied in said last named means for locking said rear axle support in an elevated position and operable on retrograde movement of the dolly to release said support.

9. In an automobile lift, a vertically collapsible rear axle support, a movable dolly constituting a front axle support, means whereby the front axle of the vehicle may be deposited on said dolly by advance of the vehicle, said dolly being movable under the urge of the advancing vehicle, means engageable with said dolly and operable by advance movement of said dolly to elevate said rear axle support into its axle engaging position, means for causing said dolly engaging means to become disengaged from said dolly on the latter being advanced a pre-determined distance to permit continued advance of the dolly after said rear axle support has been elevated, means embodied in said last named means for locking said rear axle support in an elevated position and operable on retrograde movement of the dolly to release said support, and means whereby retrograde movement of said dolly will collapse said rear axle support.

10. In a vehicle lift, a front axle support, a rear axle support, each of said supports having ascending planes, said front axle support being adapted to be positioned with its ascending plane above the ascending plane of the rear axle support, a ramp having a descending plane intersecting the planes of said supports, the ascending plane of the front axle support being adapted to receive the front axle of a vehicle as the front wheels of the latter move down the descending plane of the ramp and said front axle support being mounted to advance under the urge of the vehicle traversing said ramp, a base on which said ramp is movable, means for locking said ramp against movement on said base in an intermediate position, and means operable by depositing the rear axle of the vehicle on said rear axle support to release said ramp whereby said ramp may be retracted under the impulse of the vehicle wheels to free the latter.

11. In a vehicle lift, a front axle support, a rear axle support, each of said supports having ascending planes, said front axle support being adapted to be positioned with its ascending plane above the ascending plane of the rear axle support, a ramp having a descending plane intersecting the planes of said supports, the ascending plane of the front axle support being adapted to receive the front axle of a vehicle as the front wheels of the latter move down the descending plane of the ramp and said front axle support being mounted to advance under the urge of the vehicle traversing said ramp, means actuated by said front axle support for elevating the ascending plane of the rear axle support to a position to receive the rear axle of the vehicle as the rear wheels of the latter move down the descending plane of the ramp, said ramp being movable to advance under the rear wheels of the vehicle on reverse rotation thereof to advance the descending plane of the ramp relatively to the rear axle support and thereby act to lift the vehicle axles clear of the supports as the wheels of the vehicle ride upwardly over the descending plane of the ramp, said ramp being adapted to be restored to normal under the impact of the front wheels of the vehicle therewith on retrograde movement of the vehicle, means for locking the ramp in a normal intermediate position, and means operable by depositing a load on said rear axle support to release said locking means whereby said ramp is rendered free to move toward or away from said rear axle support while a load is carried on the latter.

12. In a vehicle lift, a longitudinally movable ramp having a descending plane on one end thereof, locking means for holding the ramp in an intermediate position, a movable dolly adapted to receive the front axle of a vehicle as the front wheels of the latter move down the descending plane of the ramp and adapted to advance under the urge of the advancing vehicle, a rear axle support adapted to receive the rear axle of the vehicle as the rear wheels thereof move down the descending plane of the ramp, and means operable by imposing the rear axle on said rear axle support to release said ramp locking means whereby rotation of the rear wheels of the vehicle will retract said ramp clear of the wheels; said ramp being adapted to be restored into engagement with the wheels and being operable on reverse rotation of the latter to advance beneath the wheels and thereby dispose the descending plane of the ramp forward of the initial intermediate position whereby both the rear and front axles of the vehicle will be elevated clear of their supports as the rear and front wheels ride upwardly over the descending plane of the ramp, and said ramp being retractable to normal under the impact of the front wheels of the vehicle against said descending plane on retrograde movement of the vehicle.

13. In a vehicle lift, a dolly forming a front axle support, a track on which said dolly is freely movable, a collapsible rear axle support adapted to be raised and lowered from and to a normal depressed position, a trip mechanism, a connection carrying said trip mechanism for actuating said rear axle support, said trip mechanism including a pair of oppositely extending pawls, one of said pawls being adapted to be engaged by said dolly on advance movement of the latter to move therewith and thereby elevate said rear axle support, and the other pawl being adapted to be engaged by said dolly on return movement thereof and to move therewith to depress said rear axle support, means whereby one of said pawls will act to lock said rear axle support in its elevated position, and means operable by said dolly to actuate said pawl to release said rear axle support.

In testimony whereof, I have affixed my signature.

MERRILL W. HARD.